United States Patent [19]

Wattron

[11] 4,397,135
[45] Aug. 9, 1983

[54] FORKLESS HAYMAKING MACHINE

[75] Inventor: Albert Wattron, Schwenheim, France

[73] Assignee: Belrecolt S.A., Marmoutier, France

[21] Appl. No.: 187,806

[22] Filed: Sep. 16, 1980

[30] Foreign Application Priority Data

Sep. 18, 1979 [FR] France .................................. 79 23659

[51] Int. Cl.$^3$ .............................................. A01D 81/00
[52] U.S. Cl. ........................................ 56/377; 56/366; 56/370
[58] Field of Search .................................. 56/365-377

[56] References Cited

U.S. PATENT DOCUMENTS

| 3,125,845 | 3/1964 | Lee | 56/377 |
| 4,015,411 | 4/1977 | Lely | 56/366 |
| 4,128,987 | 12/1978 | Zweegers | 56/370 |
| 4,203,277 | 5/1980 | Kaetzel | 56/370 |
| 4,218,867 | 8/1980 | Kaetzel | 56/370 |

Primary Examiner—Robert A. Hafer
Attorney, Agent, or Firm—Ernest F. Marmorek

[57] ABSTRACT

A haymaking machine for the windrowing, tedding or turning of crops, includes at least one drum rotatable about an upright axis, a flexible and deformable skirt arranged to follow the contour of the ground, and connected near the bottom of the drum for sweeping up the crop to carry it on its upper surface, and a plurality of outwardly extending arms secured to the exterior of the drum above the skirt to aid in displacing the crop.

10 Claims, 4 Drawing Figures

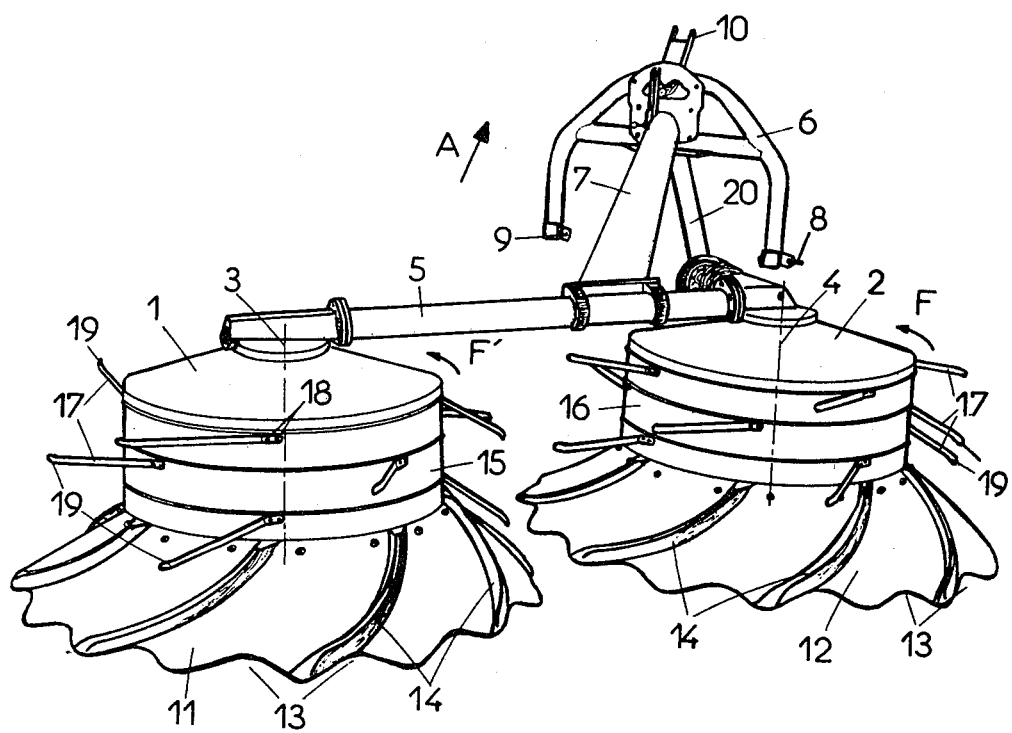
Fig:1

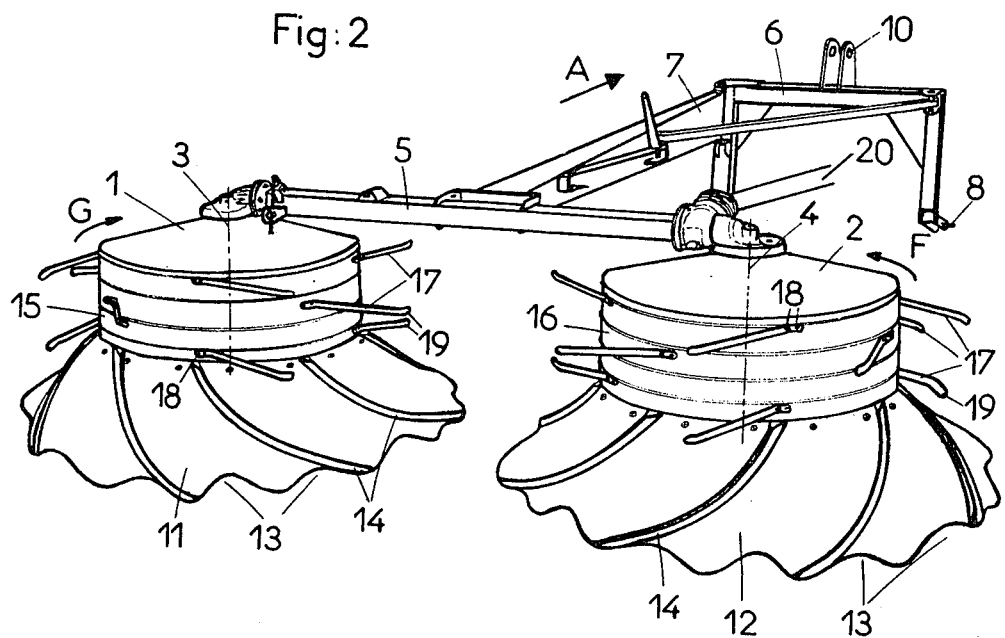

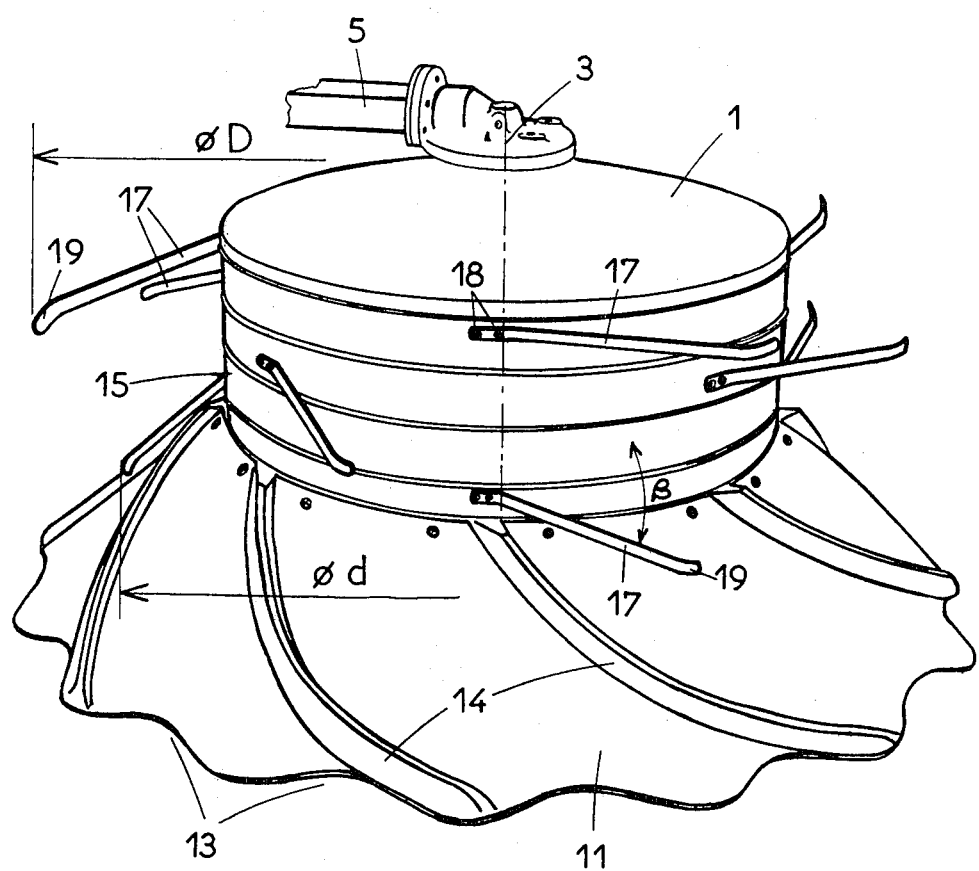
Fig: 3

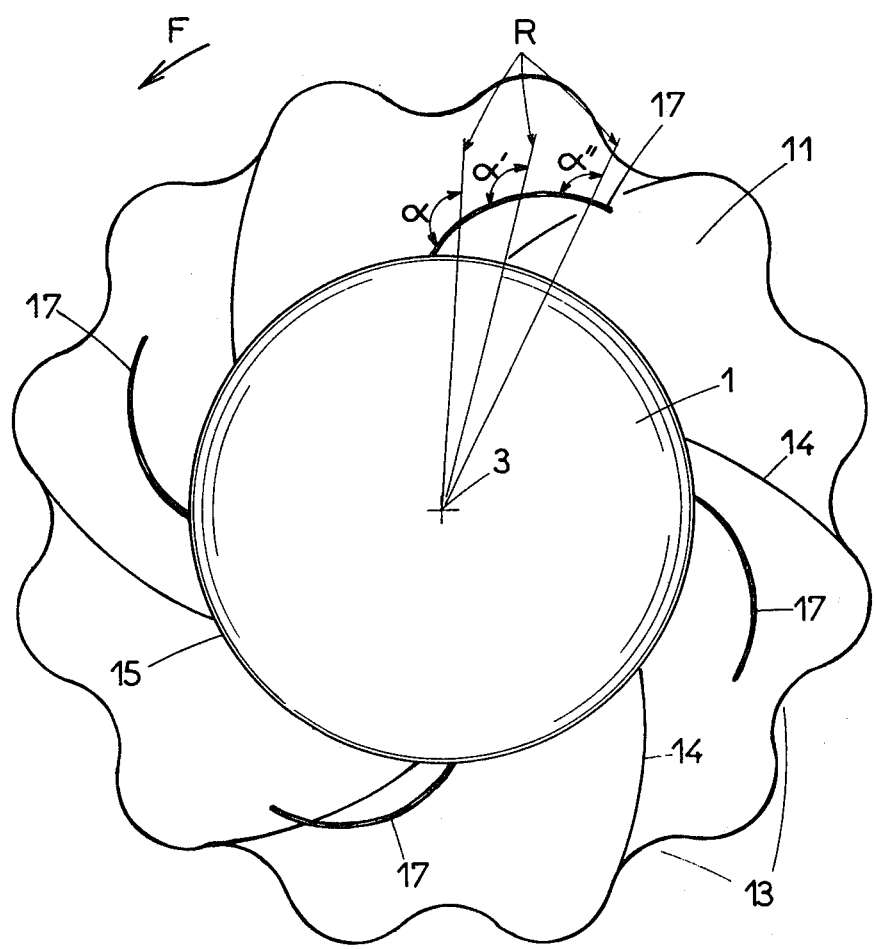
Fig: 4

FORKLESS HAYMAKING MACHINE

BACKGROUND OF THE INVENTION

The present invention relates to a haymaking machine for the windrowing of crops, for the turning of windrows or for tedding. It includes at least one driven drum rotatable about a substantially vertical or inclined axis and which has, at its base, a flexible and deformable skirt for gripping and carrying the crop.

The skirt includes a continuous thin collar. It has approximately the shape of a truncated cone and extends all around the drum. The skirt passes operatively below the crop to move it, follows closely any unevenness of the ground, sweeps up the crop and carries it on its upper surface.

The skirt replaces advantageously the metal teeth which are used at present in machines of this type. In fact, the crop, which is no longer in contact with the ground as it is being moved, is protected from being contaminated by the earth. In addition, the skirt avoids the risk of any broken forks in presses or forage harvesters used to collect the crop.

In accordance with the cylindrical present invention, the wall of the drum is fitted with arms or arms of elongated shape which help in moving the crop. These bars extend, advantageously, in planes which are substantially perpendicular to the axis of rotation of the drum and are pointed in the direction opposite to the direction of rotation of the drum. The arms are easy to implement and do not give rise to any harmful ventilation.

During operation, the arms prevent the crop from building up against the cylindrical wall of the drum, thereby making possible a very even movement of the crop. In addition, as a result of the direction in which the arms point, they do not get entangled with the crop. Thus, during the windrowing operation, the crop is deposited in even, compact windrows which can be collected easily with a press or a forage harvester.

In accordance with another characteristic of the invention, the arms which are arranged at the lower part of each drum, can be pointed downwardly. In this way, the arms are closer to the skirt and co-operate closely therewith for the purpose of carrying the crop.

In the case of lateral raking operations using a machine which has several drums fitted with arms in accordance with the present invention, the arms serve to partly close the gap between two adjacent drums. In this way, the arms prevent parts of the crop from being lost between the drums.

The arms also prevent the crop from slipping over the skirts on the sides of the machine. As a result of this feature, the width of the crop which is actually raked corresponds to about the external diameter of the skirt. In addition, the arms thus ensure a clear separation between the crop which has been collected during a run and that which is still left on the ground.

In accordance with another important characteristic of the invention, the external end of each arm is bent backwards, as viewed in the direction of rotation of the drum. As a result of this feature, the crop can be released easily from the arms, and is not dragged out of the swath behind the machine. With the same purpose in mind, the arms subtend a convex curve, which, in a plane perpendicular to the axis of rotation, and with increasing distance from the drum outer surface, has a decreasing angle between the convex curve exterior, and a radius part that projects from the axis of rotation of the drum beyond the curve exterior.

In accordance with another characteristic of the invention, the diameter of the trajectories of the arms located at the top part of each drum is greater than that of the arms located at the bottom part of the drum. This is realized, for example, by arranging for such longer arms to be mounted to the top portion of the drum. Consequently, during swathing, a slight compressing effect at the top of the swath is obtained. In addition, when the crop is very dense, the longer arms hold it at their own level and prevent it from passing over the drum or drums. Finally, as a result of their greater circumferential speed, the arms facilitate the turning of swaths which have already been formed.

The outer contour of the skirt of each drum is, however, equal to, or greater than the largest diameter of the trajectories of the arms. Consequently, it is only the skirt which comes into contact with the ground, and this feature alone provides for the gripping of the crop.

BRIEF DESCRIPTION OF THE DRAWING

Other characteristics and advantages of the invention will appear from the following description with reference to the attached drawings which represent, as non-restrictive examples, certain forms of embodiment of the invention.

In these drawings

FIG. 1 is an overall perspective view of a machine in accordance with the invention in a lateral swathing position, FIG. 2 is an overall perspective view of a machine in accordance with the invention, in a central swathing position, FIG. 3 is an enlarged view of the drum in accordance with the invention, and FIG. 4 is a plan view of a variant of the embodiment of the drum.

DESCRIPTION OF THE PREFERRED EMBODIMENTS

As shown in the drawing, the machine constructed in accordance with the invention includes two drums 1, and 2 each of which is driven so as to rotate around a respective geometric axis 3, or 4 which is substantially vertical or slightly inclined. The two drums 1, and 2 are joined together by means of a beam 5 which is itself connected to a support 6 by means of a second beam 7. The support 6 includes two lower attachment pins 8 and 9, and an upper attachment device 10 for coupling to a three-point attachment device of a tractor. Under each drum there is fitted a roller or skid which allows the machine to move over the ground. The drums 1, 2 are driven by the power from a tractor via a universal joint, 20 and line shafts which are housed in the beam 5.

Each drum 1 or 2 has at its base a relatively thin flexible and deformable skirt 11 or 12 arranged to pass below the crop, to be displaced while following any unevenness of the ground closely and arranged to carry the crop on its upper surface during operation. The crop is thus moved gently and without being in contact with the earth which might contaminate it. Each skirt 11 and 12 consist of a continuous collar which substantially the shape of a truncated cone and which extends around the corresponding drum 1 or 2. Each drum may be formed of rubber, or plastic or any other similar material. Due to the skirts 11 and 12, there are no metal parts, such as forks, which rake the crop. In fact, such forks handle the crop quite roughly and this can give rise to the forks losses due to breaking up during the swathing operation. Furthermore, such forks can break and be lost in the crop. Alternately, if the forks pass into a press or a forage harvester, they can cause considerable damage, necessitating long and difficult repair work.

The skirts 11 and 12 are advantageously provided with notches 13 and ribs 14 hich facilitate the gripping and carrying of the crop. Over a section of 90° of skirt 11 or 12 between two and eight notches 13 are provided. The number of ribs 14 corresponds substantially to half the number of notches 13. The part of each skirt 11 or 12 which is situated between two adjacent ribs 14 is, preferably, continuous, full in order to prevent losses of part of the crop.

Above the flexible and deformable skirts 11 and 12, elongated arms 17 are fitted to facilitate movement of the crop. These arms 17 are secured to the cylindrical walls 15 and 16 of the said drums 1 and 2 by means of screws 18. Other methods of attachment such as rivetting, welding and gluing can also be used. The arms 17 can, for example, be made of steel, leather, rubber or plastic. The arms co-operate closely with the skirts 11 and 12 in order to carry the crop.

The arms 17 preferably extend in planes which are substantially perpendicular to the geometrical axes 3 and 4 of the drums 1 and 2 and are pointed in a direction opposite to their direction of rotation. In this way, the arms 17 push the crop substantially to the front part of the trajectory of the skirts 11 and 12, in order to prevent the crop from building up against the cylindrical walls 15, and 16 of the drums. As a result of the way the arms 17 are arranged, the crop does not become entangled with them. In the example shown in FIG. 1, the two drums 1 and 2 rotate in the same direction of rotation as that shown by the arrows F and F'. Consequently, the crop is passed from the front drum 2 to the drum 1 which deposits the crop in the form of a lateral swath. As can be seen from FIG. 1, the arms 17 close, at least partially, the gap formed between the drums 1 and 2. The crop is, therefore, passed on from one drum to the other in its entirety.

In the embodiment example of FIG. 2, the two drums 1 and 2 rotate convergently in front arrows F and G. The drums 1 and 2 thus form a central swath. In this case, the connecting beam 5 is substantially perpendicular to the direction of forward movement A of the machine. In addition, the beam 5 is, advantageously of a telescopic construction in order that the gap between the two drums 1 and 2 may be adjusted. In this way, it is easily possible to choose the operative width in order, for example, to be able to group together two swaths for the purpose of collecting them with a forage harvester.

In addition, the arms 17 prevent the crop from slipping over the skirts 11 and 12 on the sides of the drums 1 and 2. This makes it possible on the one hand to obtain a separation along a straight line between the crop which has been collected, and that which still remains on the ground and, on the other hand to form, a compact swath substantially outside the external contour of the skirts 11 and 12.

In order to properly distribute the effect of the arms 17, they are, preferably arranged on several levels and are offset in relation to each other along the periphery of the drum. In the embodiment shown, the arms 17 are arranged on three levels.

As can be seen clearly from FIG. 3, the lower-most arms 17 are pointed downwards and form an angle $\beta$ of between 95° and 130° with the cylindrical walls 15 and 16 of the drums 1 and 2, respectively. In this way, the arms 17 co-operate better with the skirts 11 and 12 which are also pointed downwardly. However, the extremities 19 of the lowermost arms 17 are at least five centimeters from the ground in the front part of their trajectory, in order to avoid any contact with the ground. From FIG. 3 it can also be seen that the extremities 19 of all arms 17 are bent backwards, namely in a direction opposite to the direction of rotation of the respective drums 1 and 2. The bending angle is about 30° in relation to the direction of the remaining part of the arms 17. The extremities 19 can also be bent in and form of the arc of a circle. This feature prevents the crop from being entangled with the arms 17 and dragged towards the back of the machine.

In a variant shown in FIG. 4, each arm subtends a radially outward convex curve over its entire length, so that with increasing distance from the drum outer surface, the curve has a decreasing angle between the convex curve exterior, and a radius part that projects from the axis of rotation beyond the curve exterior.

Consequently the arms 17 offer no resistance to the release of the crop on the lateral parts of the drums 1, and 2. Here, the crop slides freely along the arms 17 for the purpose of forming a swath.

In accordance with another characteristic of the invention, the diameter D of the trajectory described by the arms 17 situated at the top part of each drum 1 or 2 is greater than the diameter d of the trajectory of the arms 17 situated at the bottom part of the drums. In this way, the top arms provide a slight compacting effect at the top of the swath, thereby increasing the evenness and resistance thereof. Moreover, when a swath is being turned, the arms produce an actual rotation by the crop of about 180°. Any crop which has become damp by contact with the ground is, therefore, also exposed to the sun. Finally, the arms 19 prevent the crop from passing over the drums 1 and 2 when the crop is dense. For this purpose, in the embodiment examples shown in FIGS. 1 through 3, the uppermost arms 17 are longer than the lowermost arms 17.

However, the same result can be obtained by altering the direction of the uppermost arms 17 so as to bring them closer to a radial position.

In accordance with another feature of the invention, the external contour of the skirts 11 and 12 is equal or greater than the diameter D of the trajectories of the arms 17. Consequently the skirts 11, and 12 alone grip the crop at ground level.

The machine, in accordance with the invention, is not restricted to the swathing of crops. It can also be used to swath other products, such as vine shoots.

It is obvious that other improvements, alterations or additions can be made, or that certain items can be replaced by equivalent items without thereby departing from the scope of the present invention.

I claim:
1. A haymaking machine for the windrowing, tedding or turning of crops,
comprising in combination:
at least one drum rotatable about an upright axis,
a flexible and deformable skirt arranged to follow the contour of the ground and being connected near the bottom of said drum for sweeping up the crop to carry it on its upper surface, and a plurality of rigid, outwardly extending arms rigidly secured to the exterior of said drum above said skirt to aid in displacing the crop, each arm having a length at least 20% of the drum radius, said arms being disposed on different drum levels, and wherein the extremeties of the arms disposed at the lowest level on said drum are operatively disposed at least 5 centimeters from the ground during a front portion of their trajectory, as defined with respect to a forward movement of the haymaking machine.

2. A haymaking machine as claimed in claim 1, wherein said drum is rotatable in one direction, the end portions of said rigid arms extending in a direction substantially opposite to said one direction.

3. A haymaking machine as claimed in claim 1, wherein said rigid arms are offset from one another on each level along the periphery of the drum.

4. A haymaking machine as claimed in claim 3, wherein the rigid arms disposed at the lowest level of said drum point downwardly.

5. A haymaking machine as claimed in claim 4, wherein said drum has a front portion as defined with respect to a forward movement of the haymaking machine, and wherein the extremities of the rigid arms disposed at said lowest level on said drum are operatively disposed at least 5 centimeters from the ground during the front portion of their trajectory.

6. A haymaking machine as claimed in claim 1, wherein each rigid arm is convexly curved radially outwardly along a continuous curve over its entire length and wherein said curve, in a plane perpendicular to the axis of rotation, and with increasing distance from the drum outer surface, has a decreasing angle between the convex curve exterior and a radius part that projects from said axis beyond said curve exterior.

7. A haymaking machine as claimed in claim 3, wherein the rigid arms disposed on the uppermost level on said drum have an operative trajectory of a diameter exceeding the diameter of the operative trajectory of the arms disposed on the lowermost level.

8. A haymaking machine as claimed in claim 3, wherein each rigid arm disposed on the uppermost level on said drum has a length exceeding the length of each arm disposed on the lowermost level.

9. A haymaking machine as claimed in claim 1, wherein said drum has a predetermined direction of rotation and wherein the rigid arms point in a direction generally opposite to the direction of rotation of the drum.

10. A haymaking machine for the windrowing, tedding or turning of crops, comprising in combination:

at least one drum rotatable about an upright axis, a flexible and deformable skirt arranged to follow the contour of the ground and being connected near the bottom of said drum for sweeping up the crop to carry it on its upper surface, and a plurality of rigid, outwardly extending arms rigidly secured to the exterior of said drum above said skirt to aid in displacing the crop, each arm having a length at least 20% of the drum radius, said arm being disposed on different drum levels, and wherein the extremeties of the arms disposed at the lowest level on said drum are operatively disposed at least 5 centimeters from the ground during a front portion of their trajectory, as defined with respect to a forward movement of the haymaking machine, said skirt having an external contour defined by a minimum diameter being at least equal to, or exceeding a maximum diameter of the operative trajectory of the said rigid arms.

* * * * *